US006482053B1

(12) United States Patent
Prestenbach

(10) Patent No.: US 6,482,053 B1
(45) Date of Patent: Nov. 19, 2002

(54) MARSH EXCAVATOR

(76) Inventor: Larry Prestenbach, 204 Vine St., Houma, LA (US) 70364-1411

( * ) Notice: Subject to any disclaimer, the term of this patent is extended or adjusted under 35 U.S.C. 154(b) by 0 days.

(21) Appl. No.: 09/908,027

(22) Filed: Jul. 18, 2001

(51) Int. Cl.$^7$ .............................................. B63H 19/00

(52) U.S. Cl. .................................................. 440/12.63

(58) Field of Search ............................. 440/12.5, 12.63, 440/12.64; 305/120, 127, 122, 181; 114/61.1, 61.15, 61.18

(56) References Cited

U.S. PATENT DOCUMENTS

| | | | |
|---|---|---|---|
| 4,817,554 A | | 4/1989 | Prestenbach |
| 5,511,508 A | * | 4/1996 | Wilson, Sr. et al. ........ 114/356 |
| 5,839,802 A | * | 11/1998 | Sheets ........................ 305/52 |
| 5,899,164 A | * | 5/1999 | Coast ........................ 114/270 |
| 6,315,622 B1 | * | 11/2001 | Wilson, Sr. et al. ....... 440/12.5 |

* cited by examiner

Primary Examiner—Ed Swinehart
(74) Attorney, Agent, or Firm—Robert N. Montgomery

(57) ABSTRACT

The present invention is a flotation apparatus converting a land excavator for amphibious operation. The conversion package comprises a pair of elongated pontoon assemblies secured to each other in a spaced apart manner by transverse support beams telescopically and detachably connected to transverse sleeves located in each pontoon the beams fitted with a base to support and attach a land excavator in an operational manner. Each pontoon includes an endless track guided around it longitudinally and threaded around a head and tail sprocket assembly, the tail sprocket assembly being inboard and fully protected, driven by a hydraulically motor attached to a fully enclosed internal gear reducer. The endless track, configured with only two chain runs on each pontoon, is attached to a light weight traverse channel cleats A series of polymer guide or wear blocks are also provided, attached to each cleat. The head and tail sprocket assemblies include stub shaft and bushing bearings lubricated by an internal oil reservoir with full submersion of the gear reducer.

20 Claims, 10 Drawing Sheets

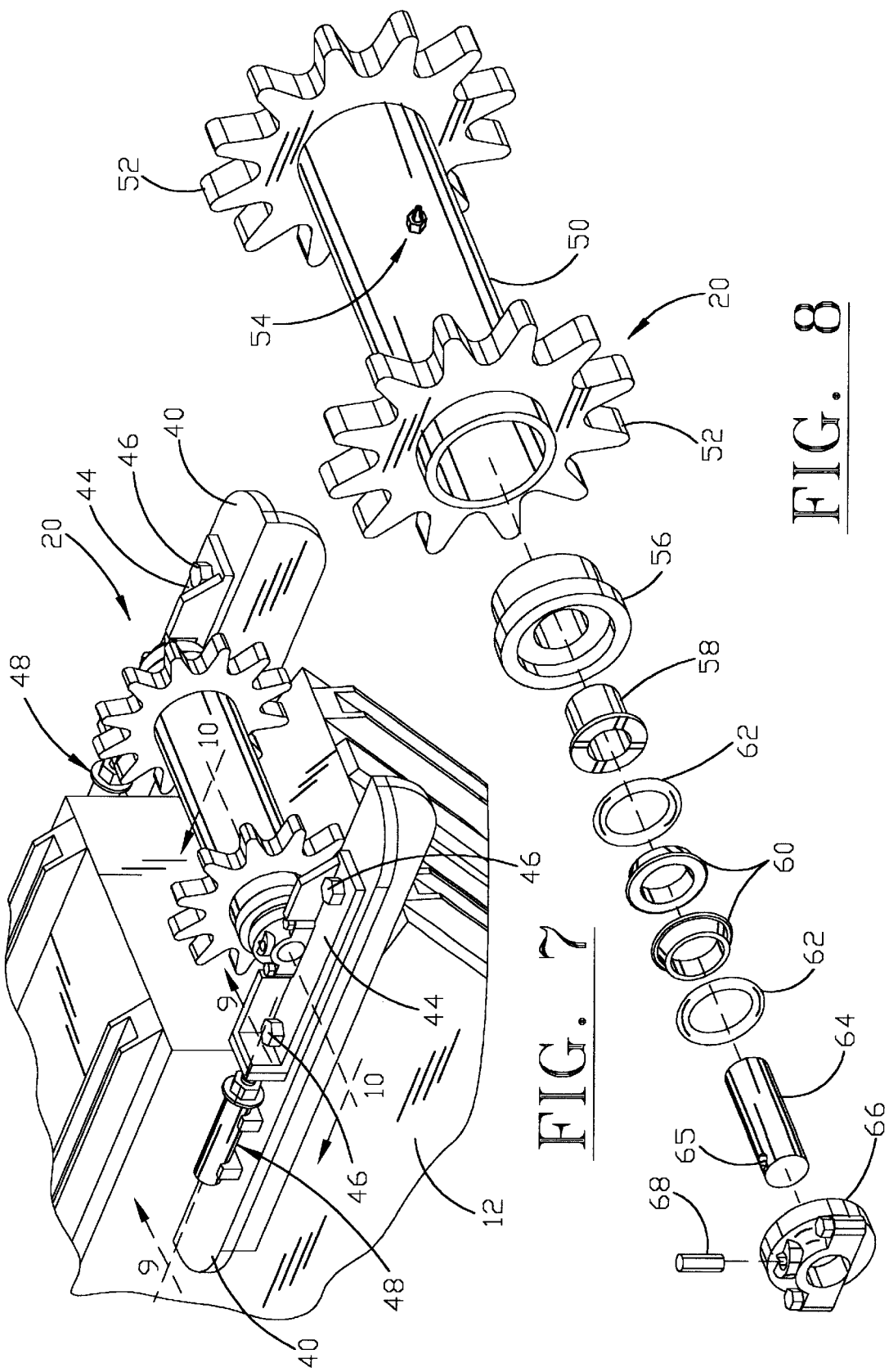

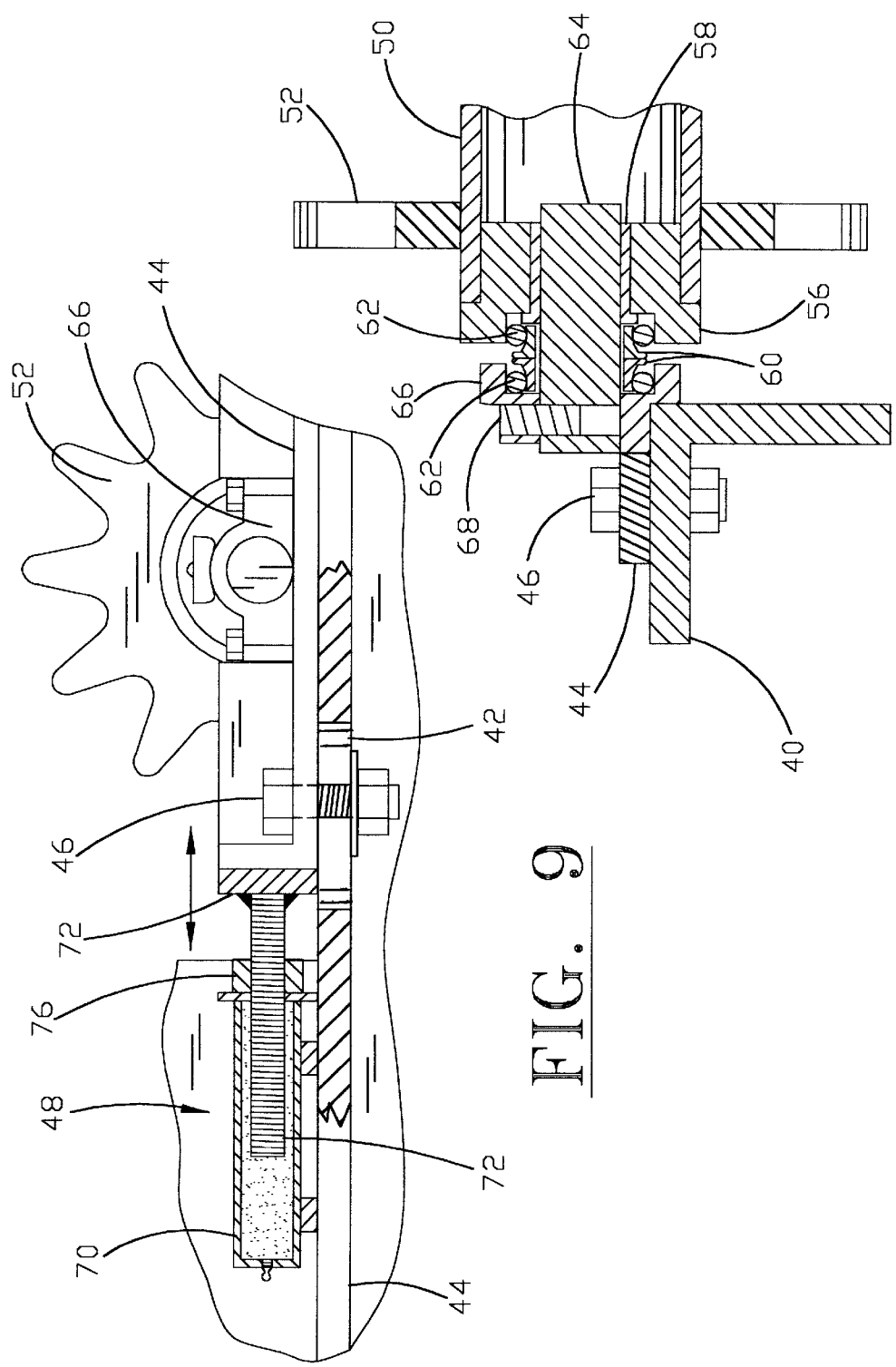

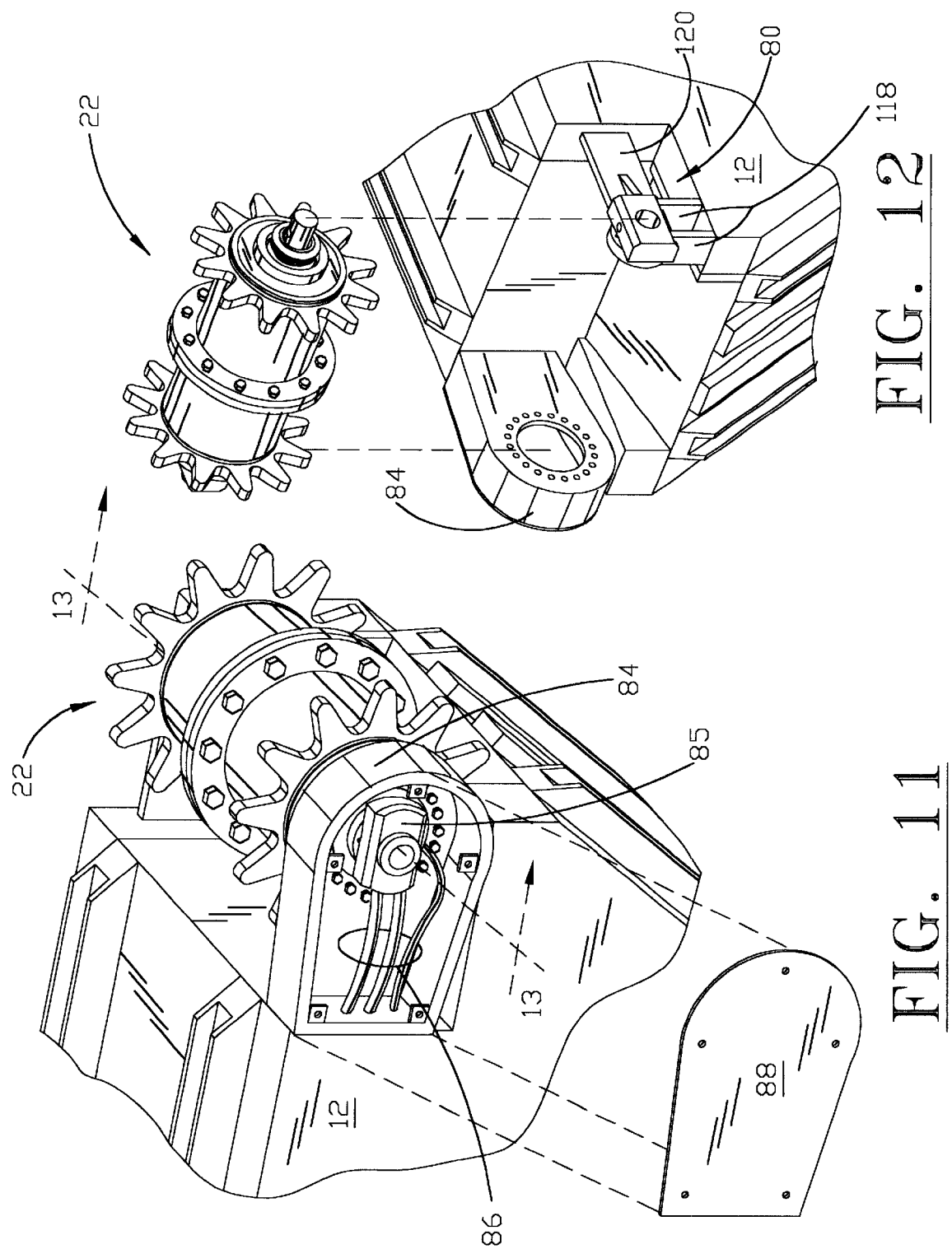

MARSH EXCAVATOR

BACKGROUND OF THE INVENTION

1. Field of the Invention

This invention relates generally to amphibious vehicles in general and more particularly to the adaptation of tracked excavators to pontoons for used in swampy marsh.

2. General Background

Tracked vehicles are regularly used in marsh areas for various operations. However, due to the limited demand for amphibious excavation equipment, it is not economically practical to mass-produce such specialized vehicles. In most cases the marsh version of an excavator of the type discussed herein is an adaptation of a standard, dry earthmover. Therefore, commercial excavators are generally stripped of their track systems and refitted with pontoons having endless guided track systems with special track cleats for use in mud and water, powered by independent track drives used to steer the vehicle. The pontoon configuration varies from manufacturer to manufacturer and displacement is governed by type and size of the excavator.

It has been the custom to provide an endless track composed of three rows of chains attached to numerous traverse channels or spaced apart cleat sections, running in longitudinal channels around the pontoons, wrapped around head and tail sprockets and further providing a means for tensioning and driving the endless track as demonstrated by U.S. Pat. No. 4,817,554. Such an arrangement has a high drag coefficient, unnecessarily increases initial chain cost and increase maintenance cost due to wear of a third chain.

Chains subjected to water tend to rust and wear prematurely leading to premature failure. Therefore, the prior art fails to address the need to reduce cost by increasing longevity of the track system. Further, mud and water is a constant problem for bearings and drive systems for obvious reasons further leading to bearing and drive failure resulting in high maintenance cost. The need for constant lubrication of the drives to prevent the incursion of mud and water into the drives is often ignored by the operators thereby leading to mechanical failure.

There is also a need to protect the drive bearing and gear reducers from damage as a result of hidden objects in the mud and water. The prior art often ignores the need for such protection, for a more perfect seal and the need for a stronger bearing arrangement in these special applications and relies primarily on off-the-shelf bearings and seals. However, as in the case of U.S. Pat. No. 4,817,554 protection is provided for a portion of the wheel motor gear reducer by enclosing the gear reducer inside a housing to which one of the drive sprockets is attached. However, the hydraulic motor is left exposed and its bearing and seals are mounted outboard of the pontoon. Two additional sprockets and their shaft are welded to the gear reducer housing. This arrangement subjects the drive sprocket assembly to hazards, increases the likelihood of bearing failure and reduces the weld area around the sprockets. Misalignment further increases sprocket and chain wear and failure. Further there is no mention of encasing the gear reducer in oil.

There is also a need for an easier way to maintain such equipment in the field, such as replaceable and or adjustable pontoons and drives sprocket assemblies that can be quickly replaced thus reducing down time.

SUMMARY OF THE INVENTION

The instant invention provides a pontoon system for converting a dry land excavator for amphibious operation. The conversion package comprises a pair of elongated pontoon assemblies secured to each other in a spaced apart manner by transverse support beams configured to support and attach to a land excavator. Each pontoon has an endless track guided around it longitudinally, threaded around a head and tail sprocket assembly, the tail sprocket assembly being fully protected and driven by a hydraulically driven motor attached thereto. The endless track, configured with only two chain runs per pontoon, is attached to light weight traverse channel cleats which allow the track to be much more flexible than cleats connected transversely to triple chains while reducing cost. A series of polymer guide or wear blocks are also provided, attached to each cleat, which further reduces drag while allowing greater flexibility when turning.

A unique head and tail sprocket assembly is provided which includes a stub shaft and bushing bearings lubricated by an internal oil reservoir which further house the hydraulic gear reducer in the drive sprocket assembly, thereby reducing noise and heat while preventing water and mud intrusion.

BRIEF DESCRIPTION OF THE DRAWINGS

For a further understanding of the nature and objects of the present invention, reference should be made to the following detailed description taken in conjunction with the accompanying drawings, in which, like parts are given like reference numerals, and wherein:

FIG. 7 is an isometric view of the forward chain tension sprocket assembly;

FIG. 8 is an exploded view of the forward chain tension sprocket assembly;

FIG. 9 is a cross section view taken along sight lines 9—9 as seen in FIG. 7;

FIG. 10 is a cross section view taken along sight lines 10—10 as seen in FIG. 7;

FIG. 11 is a partial isometric assembly view of the drive sprocket assembly;

FIG. 12 is a partial isometric exploded view of the drive sprocket assembly installation;

DETAILED DESCRIPTION OF THE PREFERRED EMBODIMENT

Figure 1:
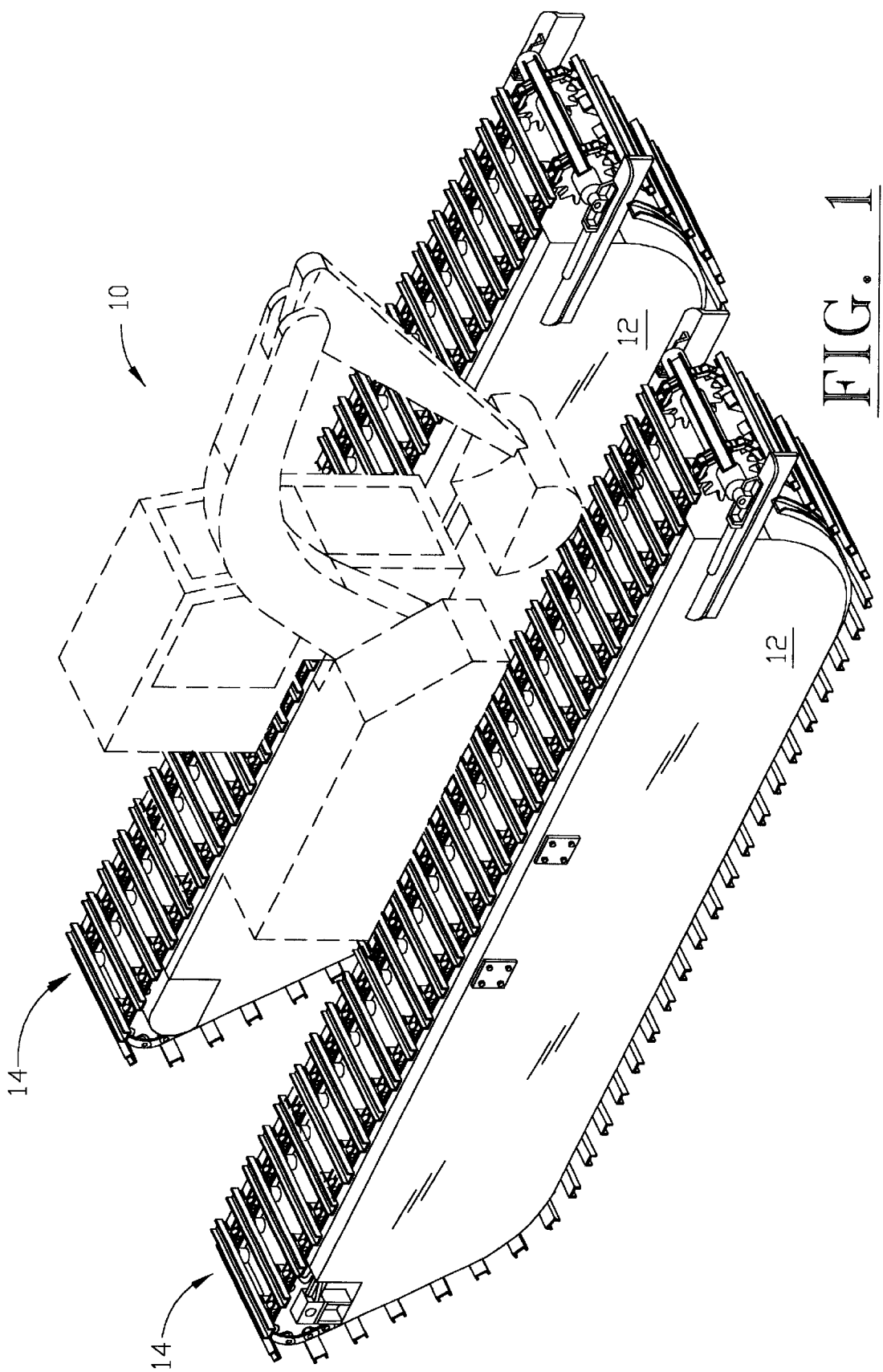
FIG. 1 is an isometric view of the pontoon track assembly adapted to a land type excavator.
Figure 4:
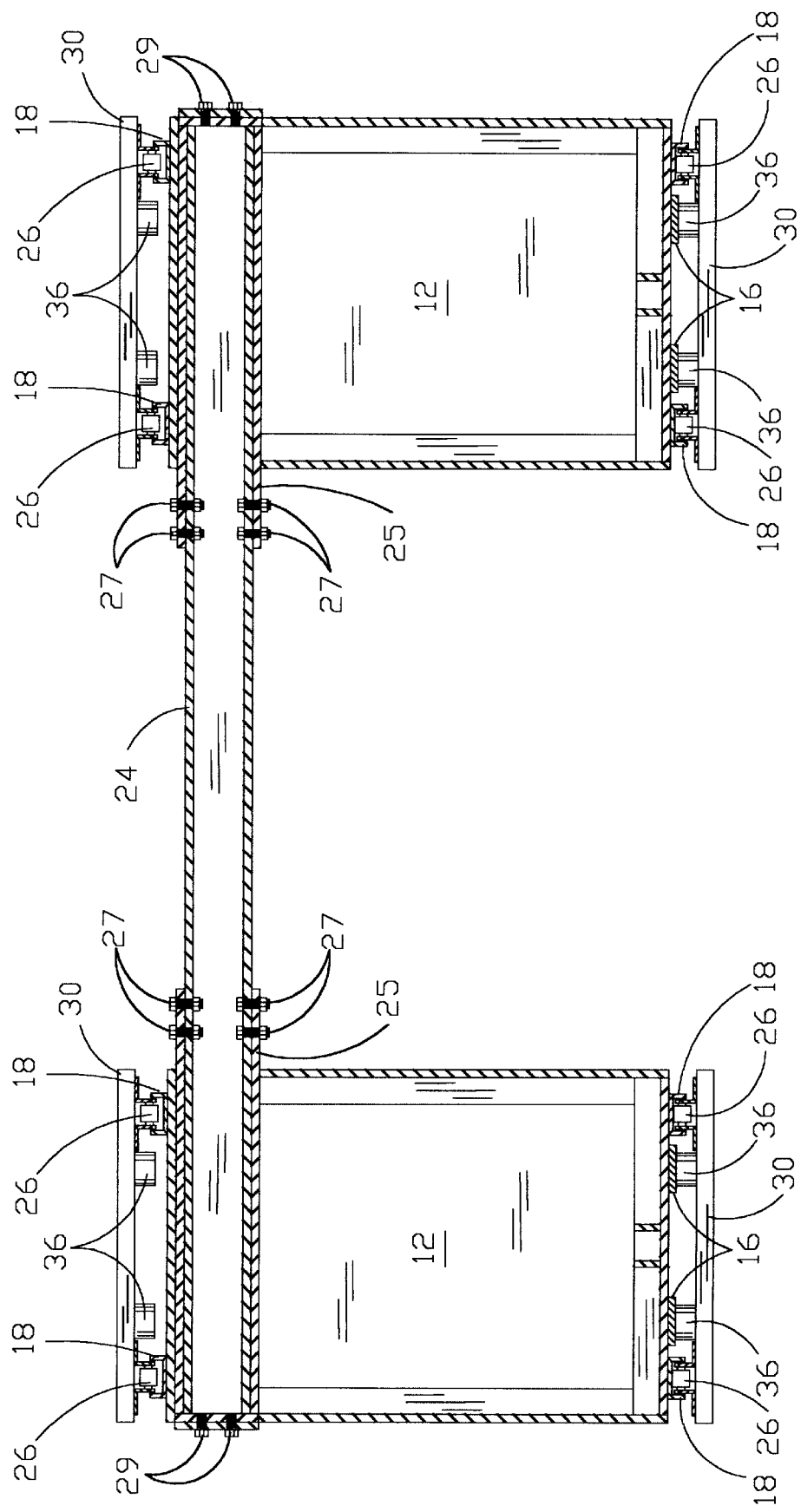
FIG. 4 is a cross section view taken along sight lines 4—4 seen in FIG. 3.

As first seen in FIG. 1 the conversion of a tracked earth excavator 11 to a flotation excavator is a an result of removing the earth track components from the excavator 11 including its sprockets and hydraulic track drive and installing the excavator on a tracked pontoon flotation assembly 10 which includes a pair of pontoons 12 configured with a set of endless transverse channel cleat tracks 14 attached to two chain runs on each pontoon 12. As more defined in FIG. 2 the pontoons 12 are hollow skids, which include wear strips 16, chain channels 18 head sprocket assemblies 20 and drive sprocket assemblies 22. As better seen in cross section FIG. 4 the pontoons 12 are connected by cross beams 24 extending clear though the pontoons 12 by way of sleeves 25 welded into the pontoons and are secured to the sleeves 25 by fasteners 27, 29 in a manner whereby the pontoons may be removed, extended, narrowed or adapted to fit other types of equipment without reconfiguring the pontoons or their track assemblies 14 first seen in FIG. 1. Therefore, the pontoons 12 and their track assemblies 14 are not dependent on the excavator 11, except for hydraulic power to drive the tracks 14. Adapter bearing tub 92 and the alignment pin 96 seen in FIG. 2 serve to adapt the excavating equipment to the base frame or spacer beans 24. Other such connections are fabricated in conformance with a particular type and brand of equipment i.e. excavator 11, as required for attachment to the cross beams 24. Hydraulic conduits 98 connecting the hydraulic power unit on the rotatable excavator 11 to the enclosed drive sprocket motors 85 on each pontoon as seen in FIG. 11 are routed inside the pontoons 12, thereby reducing their exposure to hazard. Flexible connections may be provided at the entrance and exits of the pontoons for ease of assembly and quick disconnect of the pontoon track assembly 14.

Figure 2:
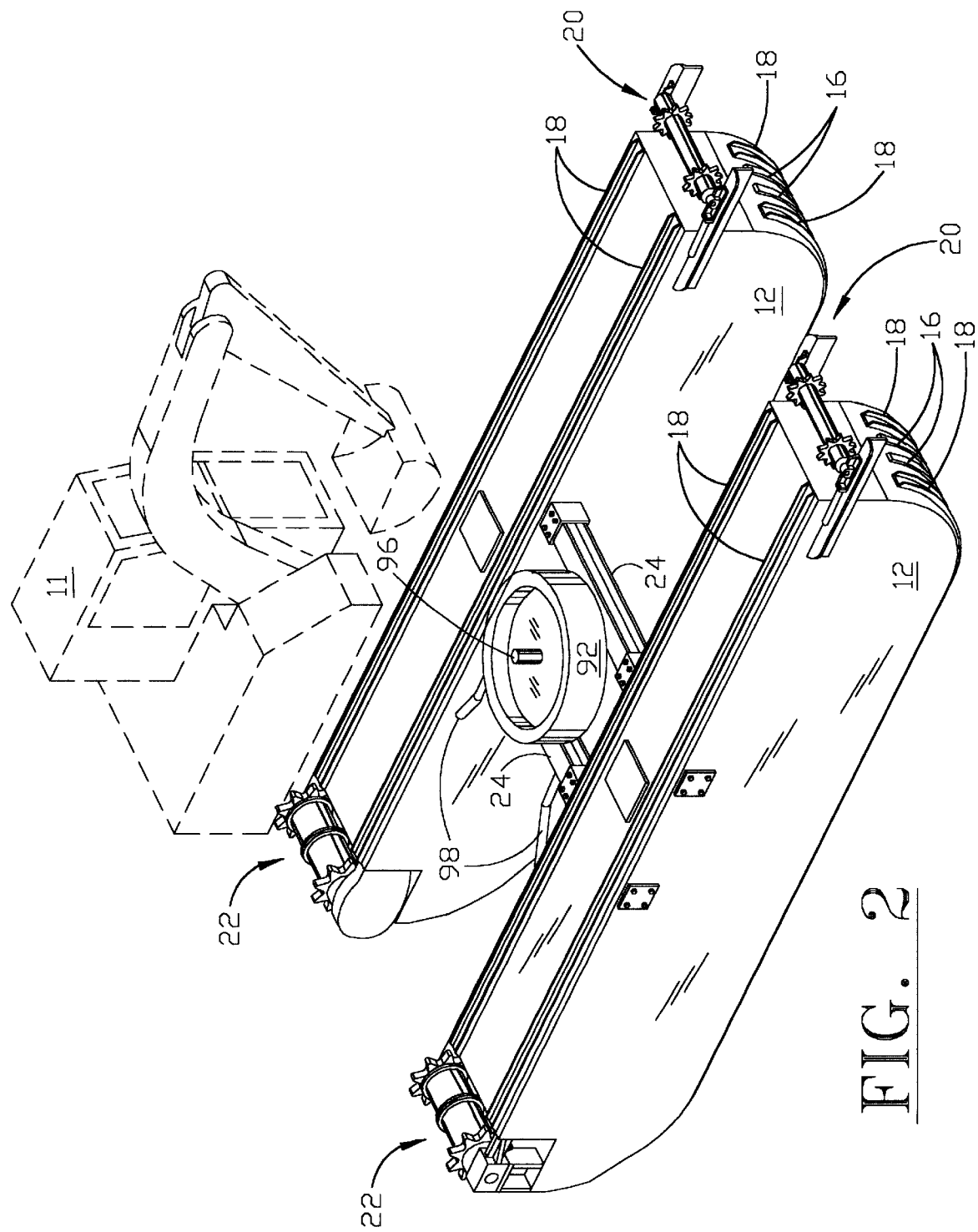
FIG. 2 is an isometric view of the pontoon track assembly with excavator displaced, showing track rails and sprocket assemblies.
Figure 3:
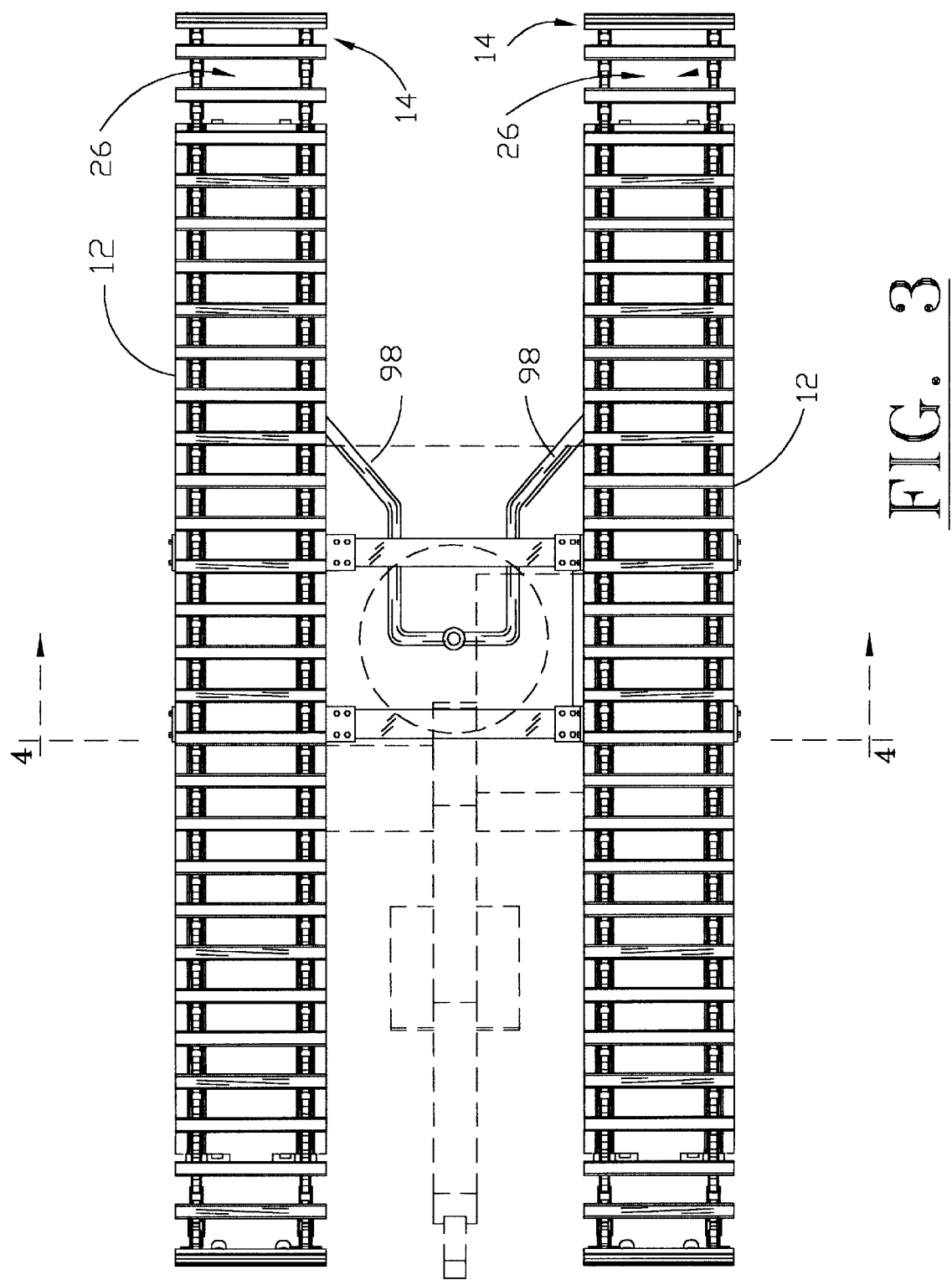
FIG. 3 is a bottom view of the pontoon and track assembly.
Figure 5:
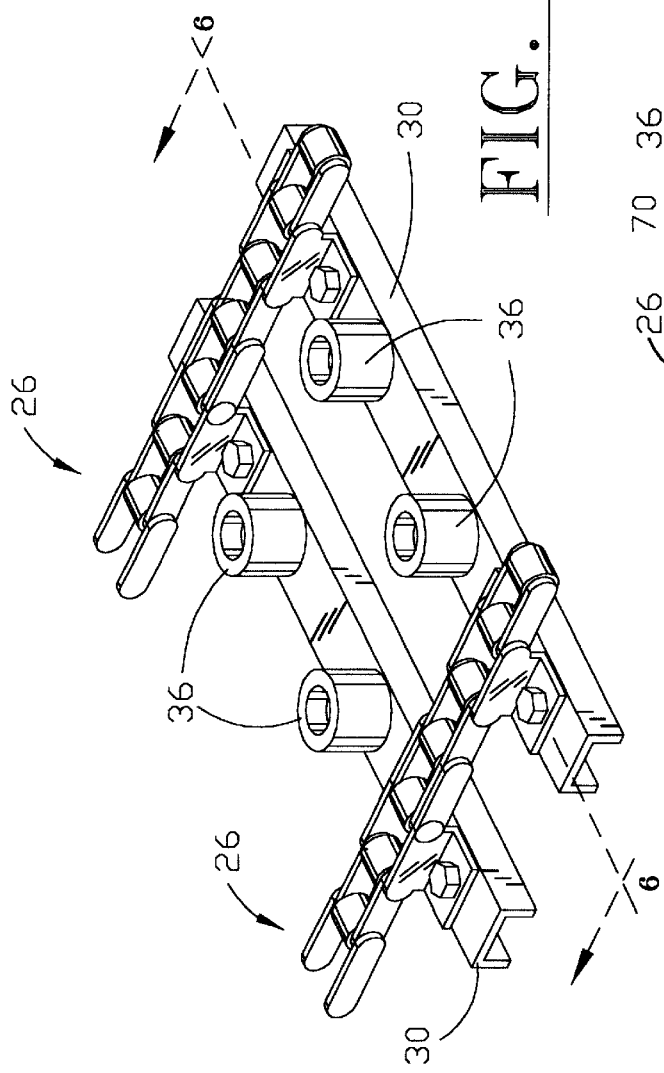
FIG. 5 is a partial isometric view of the chain and cleat arrangement.
Figure 6:
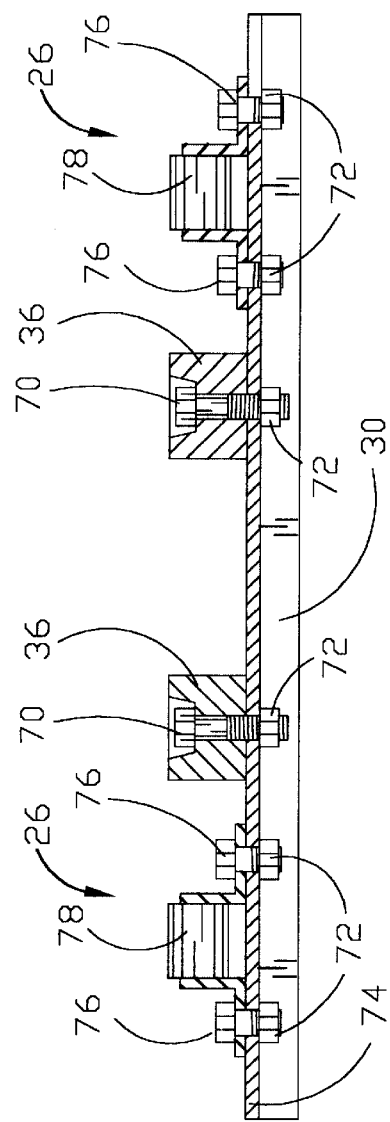
FIG. 6 is a cross section view of the chain cleats and guides taken along sight lines 6—6 in FIG. 5.

As seen in FIG. 3, the track assembly 14 is an endless loop of cleat members attached to a pair of roller chains 26 fed around the elongated pontoons 12, guided by upper and lower channels 18, and supported by lower wear strips 16 best seen in FIG. 2, The roller chains 26 are treaded around the head and drive sprocket assemblies 20.22 shown in FIG. 2. The endless track assembly 14, a portion of which is shown in detail in FIG. 5, includes multiple cleat members 30 centrally attached to a pair of roller chains 26. The cleats 30 are fitted with polymeric support members 36 secured to the cleats 30 with bolts 70 recessed in and passing there through as seen in FIG. 6 which serve as wear pads. The roller chains 26 are fastened to the cleats 30 as seen in FIG. 6 with threaded fasteners 72, 76 and Therefore, it can be seen in FIG. 4 that the rollers 78 of the chain assembly 26 run in the fabricated guide channel 18 attached along and adjacent the outer edges of the pontoon's longitudinal length and the polymeric support blocks or wear pads 36 travel along the surface of the wear strips 16 located between the guide channels 18. This arrangement reduces flexure at each end of the cleat member 30 Obviously the wear pads 36 can be replaced without removing the chains 26.

Looking now at FIG. 7 we see the head sprocket assembly 20, located at the upper forward end of each of the pontoons 12, is supported by a pair of heavy structural right angle members 40 having slots 42 in its upper flange as shown in FIG. 9 welded to each side of the pontoon 12. The head sprocket assembly 20 is further supported and attached to an adjustable sliding angle bar 44 attached to the angle members 40 by bolts 46 slidable in slots 42. The sliding angle bars 44 at each end of the head sprocket assembly 20 are slidably adjustable by extending or retracting the jacking screw assemblies 48 and thereby positioning the head sprocket 20 in a manner which exerts tension on the chains 26 independently. As seen in FIG. 8, the head sprocket assembly 20 is composed of a tubular member 50 having a flat plate type sprocket 52 adjacent each end. The tube 50 is fitted with an oil filler fitting 54. Each end of the tube 50 includes an internal bearing hub 56 fitted with an internal flanged bushing 58, a pair of back-to-back o-ring retainers 60 fitted with heavy duty o-rings 62. A stub shaft 64 slidable and rotatable within the bushing 58 is secured into the shaft hub 66 by shaft lock pin 68. The shaft hub is threadably fastened to the sliding angle bar 40 and further welded to the bar 40 at assemble. Heavy oil is then injected into the oil insert fitting 54 thereby filling the entire assembly with oil thereby preventing intrusion of water and mud.

Head sprocket adjustment is achieve with the jacking screw assembly 48 constructed as seen in FIG. 9 excreting force against the sliding bar 44. The jackscrew 48 is an enclosed tube 70 attached to the support member 44 having a threaded member 72 fitted with a push bar 74 and a nut 76. The enclosed tube is injected with lubricant at assembly to fill the cavity around the threaded member 72.

The head sprocket bearing and stub shafts are assembled at each end of the head sprocket assembly as shown in FIG. 10 with the component elements shown in FIG. 8.

Figure 13:
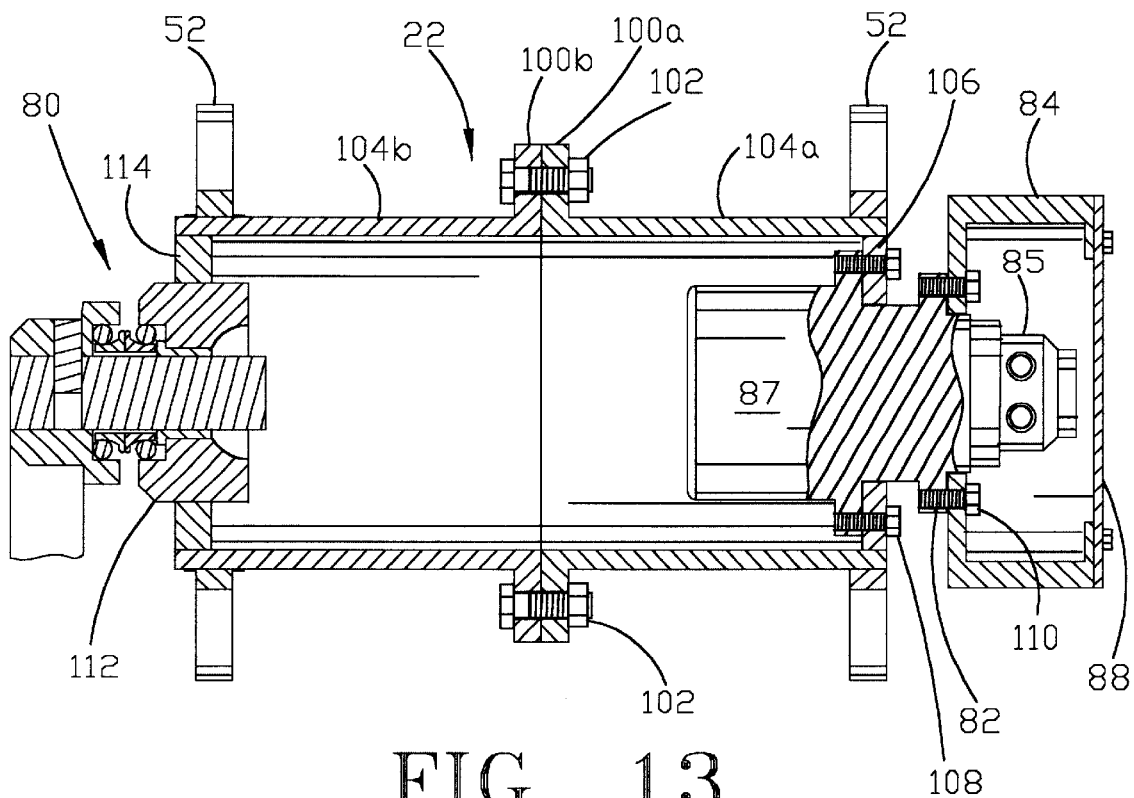
FIG. 13 is a cross section view taken along sight lines 13—13 as seen in FIG. 11.

Turning now to FIG. 11 we see that the rear portion of each of the pontoons 12 are notched to receive the drive sprocket assemble 22 in a manner whereby the sprocket assembly is fully protected as Fuhrer seen in FIG. 12. The sprocket assembly 22 is supported on one end by a stub shaft and bushing bearing assembly 80 and by the wheel motor type gear reducer flange 82 at the opposite end as seen in FIG. 13 attached to the hydraulic motor housing 84. The hydraulic drive motors 85 and their associated piping 86 are routed through the pontoons 12, and are accessed by removing the cover plate 88.

The drive sprocket assembly as better seen in cross section FIG. 13 demonstrates how the gear reducer 87 and its attached hydraulic motor 85 is mounted to the housing 84 and the bearing assembly 80.

Figure 14:
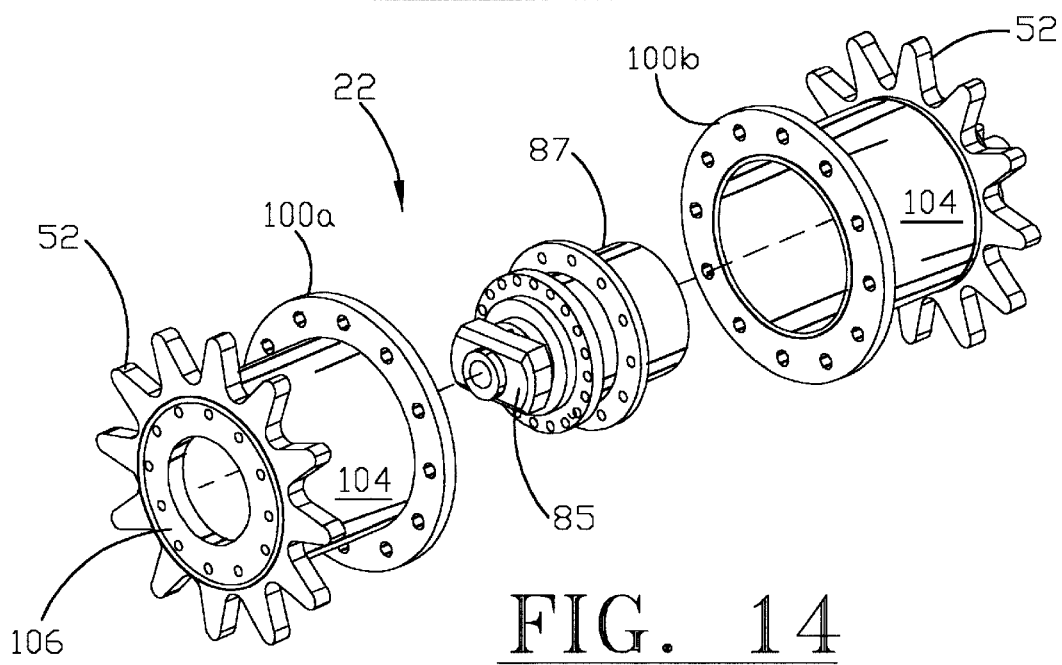
FIG. 14 is an exploded isometric view of the drive sprocket assembly.
Figure 15:
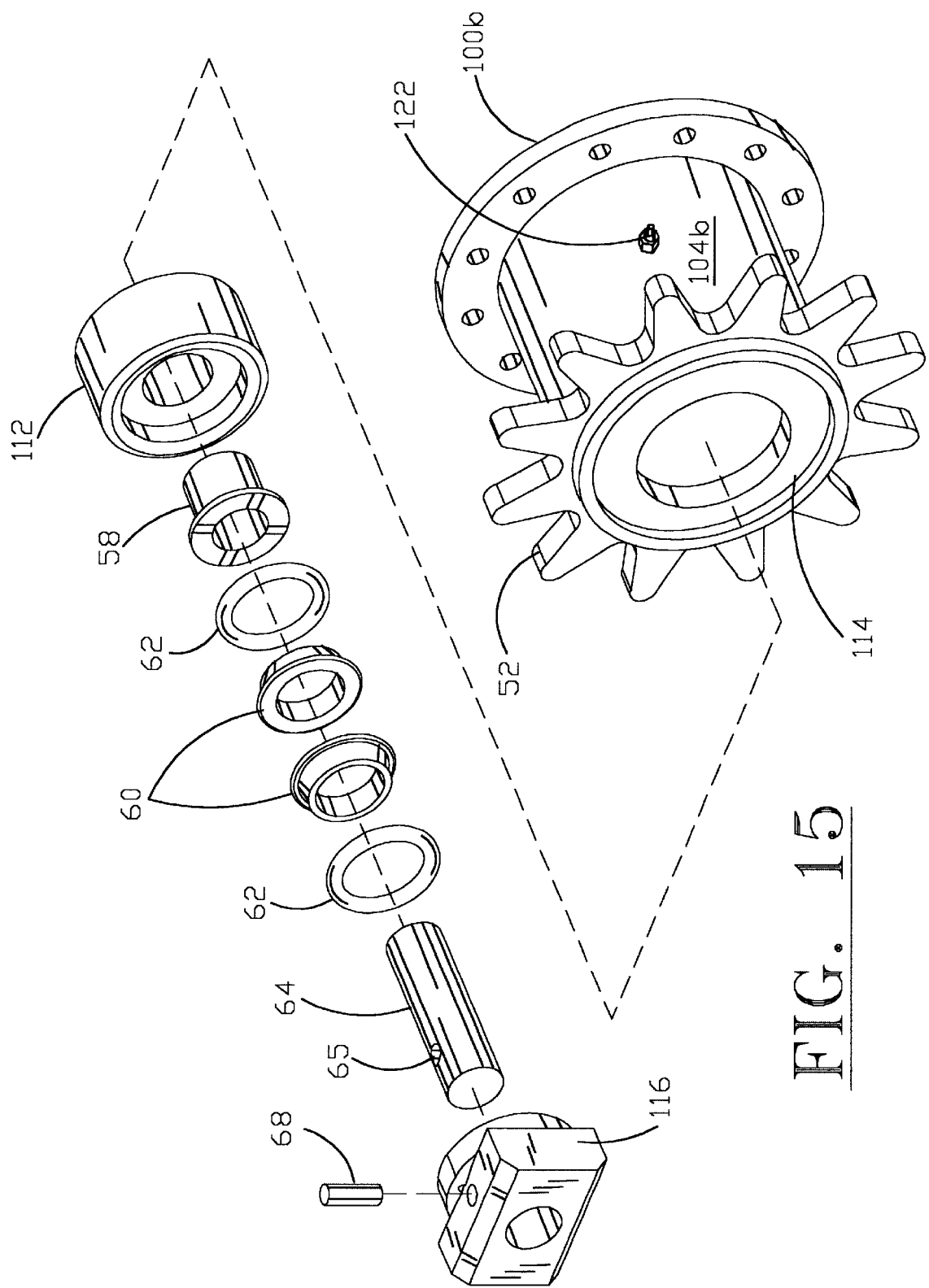
FIG. 15 is an exploded isometric view of the drive sprocket shaft and bearing assembly.

As seen in FIG. 14 and in combination with FIG. 13 the drive sprocket assembly 22 is divided into two elements, the drive or motor end and the bearing end. The two elements are joined at flanges 100a and 100b with fasteners 102. Each of the two elements includes tube portions 104a and 104b and a sprocket 52 located at the end opposite their respective flanges 100a & 100b. The drive end tube 104a is fitted internally with a mounting hub 106 adjacent the sprocket 52 for locating the rotating portion of the gear reducer 87 retained thereto by bolts 108. The stationary portion of the reducer 87 and its hydraulic motor is then fixed to the motor housing 84 with bolts 110. This allows the sprocket assembly 22 to rotate axially along a centerline running longitudinally through the motor 85 and stub shaft 64. The bearing end of the drive assembly 22 includes the same elements and is functionally the same as the head sprocket bearings. The bearing end of the tube member 104b is fitted with an internal adaptor plate 112 to which the bearing hub 112 is attached, which in turn is fitted with items 58–64 as seen in FIG. 15. Shaft hub 116 is somewhat different from that of the head sprocket hub 66 in that it is has no bolts and is further attachable to a pair of support legs 118 and a brace member 120 in the manner shown in FIG. 12 at assembly. The stub shaft 64 is like wise retained within the shaft hub 116 by a pin 68 corresponding to the shaft pinhole 65.

The drive assembly 22 is also fitted with an oil injection zerk or fitting 122 for injecting heavy oil into the sealed inner chamber surrounding the gear reducer 87 thereby maintaining permanently lubricated bearings. Heat generated by the gear reducer 87 heats the oil to an adequate viscosity to maintain proper lubrication for the bushing bearings.

Because many varying and different embodiments may be made within the scope of the inventive concept herein taught, and because many modifications may be made in the embodiments herein detailed in accordance with the descriptive requirement of the law, it is to be understood that the and details herein are to be interpreted as illustrative and not in any limiting sense.

What is claimed is:

1. An adaptation of flotation apparatus to an earth excavator comprising:
   a) a pair of pontoons with each pontoon comprising;
      i) a forward and rear bearing support members;
      ii) a notch in an upper portion of said pontoon to receive said rear bearing support members and associated drive sprocket assembly inboard of said pontoon;
      iii) at least one sleeve member passing transversely through said pontoon;
      iv) a pair of upper and lower chain guide channels extending the length of and attached to said pontoon;
      v) a pair of wear plates located between said lower chain guide channels extending the length of and attached to each said pontoon;
      vi) an endless chain assembly extending longitudinally around said pontoon and engaging said head and drive sprocket assemblies said chin assembly comprising a pair of parallel roller chains having a plurality of channel members attached perpendicularly thereto each of said channel members having a pair of polymeric guide members attached between said roller chains;
      vii) a head sprocket assembly adjustably attached to said forward bearing support members engaging said chain assembly;
      viii) a drive sprocket assembly attached to said rear bearing support engaging said chain assembly; and
   b) a means for connecting each of said pontoons one to the other in a detachable manner said means telescopically slidable within said sleeve member and connected thereto; and
   c) an adapter for attaching an excavator to said means for connecting each of said pontoons.

2. The amphibious adaptation apparatus for an earth excavator according to claim 1 wherein said roller chains roll along and are guided by said guide channels.

3. The amphibious adaptation apparatus for an earth excavator according to claim 1 wherein said apparatus further comprises conduits located within said pontoons for conducting hydraulic fluid from said excavator to said drive sprocket assembly.

4. The amphibious adaptation apparatus for an earth excavator according to claim 1 wherein said head sprocket assembly comprises;
   a) an elongated tubular member;
   b) a chain sprocket attached externally adjacent each end of said tubular member;
   c) a bearing hub having an internal central bore said hub located internally at each end of said tubular member;
   d) a flange bushing located internally in said central bore of each said bearing hub;
   e) a shaft hub having a detachable stub shaft extending there from, a pair of back to back o-ring retainers fitted with o-rings slidable upon said stub shaft, said stub shaft being rotatable within said flange bushing, located at each end of said tubular member; and
   f) mounting means attached to shaft hub for adjustably mounting said sprocket assembly to said forward bearing support members.

5. The amphibious adaptation apparatus for an earth excavator according to claim 4 wherein said head sprocket assembly further comprises a jacking screw located adjacent each said mounting means for adjusting tension on said roller chains.

6. The amphibious adaptation apparatus for an earth excavator according to claim 4 wherein said head sprocket is filled with oil.

7. The amphibious adaptation apparatus for an earth excavator according to claim 1 wherein said drive sprocket assembly comprises;
   a) a first and second elongated tubular members each said tubular member having a sprocket attached externally adjacent one end and a flange member externally attached at the opposite end said flanges being cooperatively and detachably fastened one to the other;
   b) an adapter plate located internally within each said first and second tubular members opposite said flange members;
   c) a gear reducer having a hydraulic motor attached said reducer having a fixed flange and a rotating flange with said rotating flange being attached to said adapter plate within said first tubular member;
   d) a bearing hub having an internal central bore said hub fixed to said adapter plate within said second tubular member;
   e) a flange bushing located internally in said central bore of said bearing hub;
   f) a shaft hub having a detachable stub shaft extending there from, a pair of back to back o-ring retainers fitted with o-rings slidable upon said stub shaft, said stub shaft being rotatable within said flange bushing, located at end of said second tubular member; and
   g) mounting means attached to said shaft hub for fixing said shaft hub within said notch of said pontoon.

8. The amphibious adaptation apparatus for an earth excavator according to claim 7 wherein said first and second tubular members are filled with oil at assembly.

9. The amphibious adaptation apparatus for an earth excavator according to claim 7 further comprising a housing fixed inboard of said notch in said pontoon adapted for detachable connection to said rotating flange thereby enclosing said hydraulic motor and its hydraulic fluid connections at assembly.

10. The amphibious adaptation apparatus for an earth excavator according to claim 9 wherein said housing comprises an access cover plate.

11. An adaptation of flotation apparatus to an earth excavator for amphibious use comprising:
    a) a pair of pontoons each pontoon having forward and rear bearing support members an upper portion of each said pontoon notched to receive said rear bearing support members inboard of said pontoon;
    b) a spacer means for holding said pair of pontoons in a spaced apart relationship;
    c) an adapter for attaching an excavator to said spacer means;
    d) a sleeve means passing transversely through each of said pontoons for telescopically receiving and securing said spacer means in a detachable manner;
    e) a pair of upper and lower chain guide channels extending the length of and attached to each said pontoon;
    f) a pair of wear plates located between said lower guide channels extending the length of and attached to each said pontoon;

g) a head sprocket assembly adjustably attached to said forward bearing support members and a drive sprocket assembly attached to said rear bearing support members; and h) an endless chain assembly extending longitudinally around said pontoon in rolling contact with and guided by said guide channels and in engagement with said head and drive sprocket assembly said chain assembly comprising a pair of roller chains having a plurality of channel members attached perpendicularly thereto each of said channels having a pair of polymeric guide members attached between said roller chains.

12. The amphibious adaptation apparatus for an earth excavator according to claim 11 wherein said apparatus further comprises conduits located within said pontoons for conducting hydraulic fluid from said excavator to said drive sprocket assembly.

13. The amphibious adaptation apparatus for an earth excavator according to claim 11 wherein said head sprocket assembly comprises;

a) an elongated tubular member having an oil injection fitting located midway there along;

b) a chain sprocket attached externally adjacent each end of said tubular member;

c) a bearing hub having an internal central bore said hub located internally at each end of said tubular member;

d) a flange bushing located internally in said central bore of each said bearing hub;

e) a shaft hub having a detachable stub shaft extending there from, a pair of back to back o-ring retainers fitted with o-rings slidable upon said stub shaft, said stub shaft being rotatable within said flange bushing, located at each end of said tubular member; and f) mounting means attached to shaft hub for adjustably mounting said sprocket assembly to said forward bearing support members.

14. The amphibious adaptation apparatus for an earth excavator according to claim 13 wherein said head sprocket assembly further comprises a jacking screw located adjacent each said mounting means for adjusting tension on said roller chains.

15. The amphibious adaptation apparatus for an earth excavator according to claim 13 wherein said head sprocket is filled with oil.

16. The amphibious adaptation apparatus for an earth excavator according to claim 11 wherein said drive sprocket assembly comprises;

a) a first and second elongated tubular members each said tubular member having a sprocket attached externally adjacent one end and a flange member externally attached at the opposite end said flanges being cooperatively and detachably fastened one to the other;

b) an adapter plate located internally within each said first and second tubular members opposite said flange members;

c) a gear reducer having a hydraulic motor attached said reducer having a fixed flange and a rotating flange with said rotating flange being attached to said adapter plate within said first tubular member;

d) a bearing hub having an internal central bore said hub fixed to said adapter plate within said second tubular member;

e) a flange bushing located internally in said central bore of said bearing hub;

f) a shaft hub having a detachable stub shaft extending there from, a pair of back to back o-ring retainers fitted with o-rings slidable upon said stub shaft, said stub shaft being rotatable within said flange bushing, located at end of said second tubular member; and g) mounting means attached to said shaft hub for fixing said shaft hub within said notch of said pontoon.

17. The amphibious adaptation apparatus for an earth excavator according to claim 16 wherein said first and second tubular members are filled with oil at assembly.

18. The amphibious adaptation apparatus for an earth excavator according to claim 16 further comprising a housing fixed inboard of said notch in said pontoon adapted for detachable connection to said rotating flange thereby enclosing said hydraulic motor and its hydraulic fluid connections at assembly.

19. The amphibious adaptation apparatus for an earth excavator according to claim 18 wherein said housing comprises an access cover plate.

20. A method for adapting an earth excavator for amphibious use comprising the steps of;

a) adapting a base frame in an operationally manner to an earth excavating apparatus;

b) attaching a pair of hydraulically driven track pontoons to said base frame in a detachable manner each said pontoons comprising, forward and rear bearing support members an upper portion of each said pontoon notched to receive said rear bearing support members inboard of said pontoon, a sleeve means passing transversely through each of said pontoons for telescopically receiving and securing a portion of said base frame, a pair of upper and lower chain guide channels extending the length of and attached to each said pontoon, a pair of wear plates located between said lower guide channels extending the length of and attached to each said pontoon, a head sprocket assembly comprising an elongated tubular member having a chain sprocket attached externally adjacent each end of said tubular member, a bearing hub having an internal central bore, said hub located internally at each end of said tubular member, a flange bushing located internally in said central bore of each said bearing hub, a shaft hub having a detachable stub shaft extending there from, a pair of back to back o-ring retainers fitted with o-rings slidable upon said stub shaft, said stub shaft being rotatable within said flange bushing, located at each end of said tubular member and a mounting means attached to shaft hub for adjustably mounting said sprocket assembly attached to said forward bearing support members and a drive sprocket assembly comprising a first and second elongated tubular members each said tubular member having a sprocket attached externally adjacent one end and a flange member externally attached at the opposite end said flanges being cooperatively and detachably fastened one to the other, an adapter plate located internally within each said first and second tubular members opposite said flange members, a gear reducer having a hydraulic motor attached said reducer having a fixed flange and a rotating flange with said rotating flange being attached to said adapter plate within said first tubular member, a bearing hub having an internal central bore said hub fixed to said adapter plate within said second tubular member, a flange bushing located internally in said central bore of said bearing hub, a shaft hub having a detachable stub shaft extending there from, a pair of back to back o-ring retainers fitted with o-rings slidable upon said stub shaft, said stub shaft being rotatable within said flange bushing, located at end of said second tubular member; and a mounting means attached to said shaft hub for fixing said shaft hub within said notch of said pontoon, attached to said rear bearing support members and an endless chain assembly extending longitudinally around said pontoon in rolling contact with and guided by said guide channels and in engagement with said head and drive sprocket assembly said chain assembly comprising a pair of roller chains having a plurality of channel members attached perpendicularly thereto each of said channels having a pair of polymeric guide members attached between said roller chains in sliding contact with said wear plates; and c) filling each of said head and drive sprocket assemblies with oil;

d) connecting hydraulic lines located within each said pontoon to said excavator and to said hydraulic drive motors; and e) tensioning said chains by adjusting jacking screws located adjacent each head sprocket assembly.

* * * * *